Dec. 8, 1936.   O. WITTEL   2,063,285
FILM HANDLING APPARATUS
Filed April 10, 1934
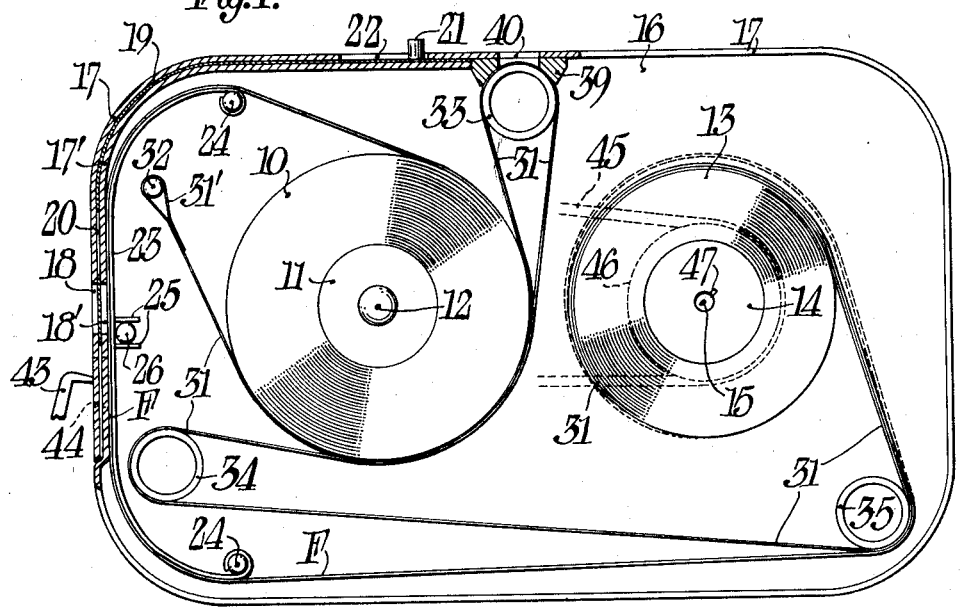
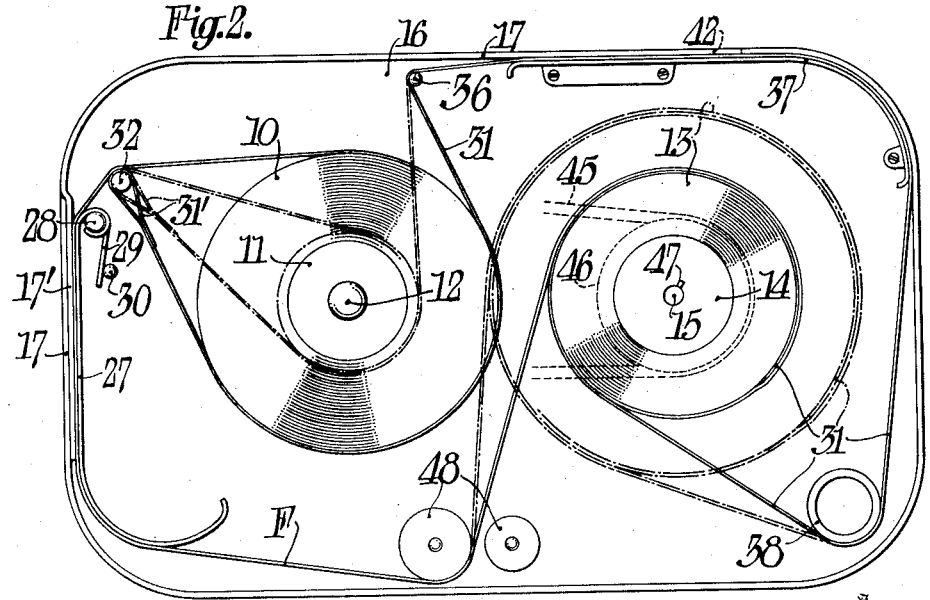
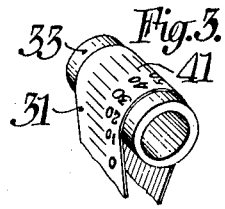
Inventor:
Otto Wittel,
George A. Gillette, Jr.
By
Attorneys Patented Dec. 8, 1936

2,063,285

UNITED STATES PATENT OFFICE 2,063,285

FILM HANDLING APPARATUS

Otto Wittel, Rochester, N. Y., assignor, by mesne assignments, to Eastman Kodak Company, Jersey City, N. J., a corporation of New Jersey Application April 10, 1934, Serial No. 719,887

21 Claims. (Cl. 88—17)

The present invention relates to a film handling apparatus and more particularly to an arrangement for controlling the movement of film from one film roll to another film roll.

Elimination of the usual film loops from motion picture equipment permits the omission of film sprockets to render the machines more compact and of simpler construction. Such elimination of the film loops, however, introduces certain difficulties such as irregular unwinding from the supply film roll and movement of the film through the film gate by the take-up.

The primary object of the present invention is the provision in a film handling apparatus without film loops of a snubbing means in frictional engagement with and for controlling the winding and unwinding of the film rolls.

Another object of the invention is the provision in a film handling apparatus of a flexible strip for controlling rotation of the film rolls and presenting to rotation of said film rolls a friction drag which varies directly with the variation in the diameters thereof.

A further object is the provision in a film handling apparatus of a flexible strip for controlling rotation of the film rolls and carrying a plurality of graduations for indicating the amount of film on one of said film rolls.

Still another object of the invention is the provision in a film handling apparatus of a flexible strip for controlling rotation of a take-up film roll which is connected to a tendency drive, said flexible strip binding between the convolutions to overcome said tendency drive and prevent the same from moving film through the gate. Said flexible strip is released by the convolutions of the take-up roll upon advancement of film through the gate by an intermittent film moving mechanism to permit the tendency drive to rotate the take-up roll until said strip is again bound between the film convolutions.

Other objects of the invention will occur to those skilled in the art by the disclosure which follows.

The above and other objects of the invention are attained in a film handling apparatus equipped with a snubbing means which is adapted to control the rotation of the film rolls, which is adapted frictionally to engage the film rolls to an extent corresponding to the diameters thereof, and which may comprise a flexible strip fixed at one end and partially encircling each of the film rolls.

Reference is hereby made to the accompanying drawing wherein like reference characters designate similar elements and wherein:

Fig. 1 is a side elevation, partially in section, of a film magazine equipped with a snubbing means according to the invention.

Fig. 2 is a side elevation of a film magazine with a slightly different arrangement of the snubbing means.

Fig. 3 is a fragmentary detail in perspective of the snubbing means provided with footage indicia.

While the present invention is described as applied to film handling apparatus within a film magazine, it is understood that the invention may be effectively applied directly to all types of film handling apparatus, such as cameras, projectors, and printers.

In the illustrated embodiments of the invention, the film rolls are rotatably mounted. The supply film roll 10 is wound upon a core 11 which is rotatably supported by a spindle 12. The take-up film roll 13 is wound upon a core 14 which is supported by a spindle 15 and which engages fin 47 on said spindle 15.

The magazine casing has a side wall 16 and an edge wall 17 which has an overlapping portion 17'. An exposure aperture is formed by openings 18 and 18' which are provided respectively in edge wall 17, and its overlapping portion 17'. A flexible shutter 19, see Fig. 1, is slidably mounted between edge 17 and overlapping portion 17' and is provided with an opening 20. A pin 21 is connected to shutter 19 and extends through a slot 22 in side wall 17. The shutter 19 may assume a closed position to cover the exposure aperture, as shown, or may assume an open position with opening 20 registering with openings 18 and 18' and is movable to such open position by movement of pin 21 to the other end of slot 22.

A film presser member may be constructed in various ways and is illustrated in Fig. 1 as comprising a spring band 23 which is connected at its ends to posts 24 on the side wall 16 of the magazine and which carries a pair of pins 25 engaging a post 26 also mounted on side wall 16. Another form of film presser member is shown in Fig. 2 and comprises a spring band 27 which is connected to a post 28 and which has a resilient tongue 29 bearing on a pin 30.

The path of the film F does not contain any film loops and extends from the supply roll 10, between the portion 17' and the presser member which together form the film gate, and thence over suitable guide means to the take-up roll 13.

The outstanding feature of the invention is the provision of a snubbing means for controlling the movement of the film from one film roll to the other and through the film gate. Said snubbing means partially encircles the film rolls and engages the outer convolutions of said film rolls frictionally at values which vary in direct proportion to the diameters of the respective film rolls. A convenient and illustrative form of the snubbing means comprises a flexible strip 31 which may be composed of suitable flexible material such as paper, fabric, etc., and which is fixed at one end as by a loop 31' encircling a post 32 on the side wall 16 of the magazine.

A plurality of guide members are arranged to direct or guide the flexible strip into contact with the outer convolutions of the respective film rolls 10 and 13. In the preferred form of the invention, see Fig. 1, said guide members are formed by a plurality of tubular supports, one support 33 being located to conduct the strip 31 partially to encircle the supply film roll 10, another support 34 being located to conduct the strip 31 in a double layer over the supply film roll 10 and another support 35 being located to conduct the free end of strip 31 to the take-up film roll 13 partially to encircle the same beneath the outer convolution thereof. In the alternative form of the invention, see Fig. 2, said guide members are composed of a spindle 36 located to conduct the strip 31 parmally to encircle the supply film roll 10, of a guideway 37 which is fastened to side wall 16 and which is spaced about a film thickness from edge wall 17, and of a tubular support 38 which is located to conduct the free end of strip 31 to a snubbing position beneath the outer convolution of take-up film roll 13.

The flexible strip 31 also contributes directly to the formation of a simple and effective film footage indicator. A block 39, see Fig. 1, is located between the upper edge wall 17 of the magazine casing and the tubular support 33. An opening 40 is provided in block 39 and the adjacent edge wall 17 so that footage indicia such as graduations 41, see Fig. 3, suitably located and spaced on strip 31 may be observed from the exterior of the magazine casing. An opening 42, see Fig. 2, may be provided adjacent guideway 37 in the other form of the invention for the same purpose.

The perforated film is intermittently advanced past the exposure aperture of the film gate by any recognized means such as a reciprocating claw 43 which is operated in a known manner and which engages the film F to move it step by step or frame by frame past the openings 18 and 18'. The claw 43 may enter the magazine casing through the slot 44 and with each stroke unwinds the film from the supply roll 10 as well as advances the film through the gate. Obviously, the inherent resiliency of the supply film roll 10 or this intermittent unwinding of the same would result in premature and undesirable uncoiling of the supply film roll 10. The double layer of the flexible strip 31, as shown in Fig. 1, or the single layer of strip 31, see Fig. 2, provides a snubbing action on the supply film roll 10 to prevent such unwinding.

The film is wound onto the take-up film roll 13 by means of a tendency drive also of a type well known in the art. A purely illustrative form of tendency drive is provided by a spring belt 45 which encircles a pulley 46 to drive the same but permitting slip therebetween. The pulley 46 may be directly or detachably connected to spindle 15 which drives the core 14 through a suitable connection such as the fin 47 on spindle 15.

Film guides, such as the rollers 48, see Fig. 2, may be provided for conducting the film F from the film gate to the take-up film roll 13.

Unrestrained operation of said tendency drive would cause movement of the film F past the openings 18 and 18' to cause blurring or unsteadiness in the resultant motion picture. The tension in the film gate could be increased to overcome the tendency drive and insure steadiness but this would place an excessive and undesirably large load on the intermittent film advancing mechanism. According to the invention, the free end of flexible strip 31 partially encircles the take-up roll 13 beneath the outer convolution thereof and is bound beneath the outer convolution of the film roll upon rotation thereof by the tendency drive. The length of strip 31 in frictional engagement with and beneath said outer convolution is selected so that the snubbing action is equal to or greater than the winding action of the tendency drive. In practice the length of the flexible strip is such that the free end of strip 31 extends around approximately three quarters of the periphery of the take-up roll 13.

Just prior to the intermittent engagement and advancement of the film F by claw 43, the normal tension in the film gate and/or the snubbing action of the film guides, such as spring bands 23 or 27, and tubular support 35 or film roller 48, will bind the outer convolution of take-up film roll 13 under a tension sufficient to create a frictional engagement between the convolutions of said take-up roll 13 and the free end of strip 31. Since the other end of strip 31 is fixed, the strip 31 will be drawn taut against the outer convolution of supply film roll 10. Also, the frictional engagement between the free end of strip 31 and the convolutions of take-up roll 13 is applied in opposition to the tendency drive and is of sufficient value to overcome said tendency drive and cause slipping between the elements such as spring belt 45 and pulley 46, of said tendency drive. As a result the snubbing means or flexible strip prevents movement by the tendency drive of the film F through the film gate.

After the claw 43 has advanced the film F through the film gate a distance of one frame, the tension in the film between the gate and the take-up roll 13 will be relieved and that portion of the film will assume a position as indicated by the dotted lines in Fig. 1. This reduction of tension or creation of slack in the film approaching the take-up roll 13 reduces the binding action of the outer convolution of said take-up film roll 13 and the frictional engagement between the peripheral convolutions of said roll 13 and the strip 31 is eliminated or reduced sufficiently to permit the tendency drive to rotate the roll 13.

Upon rotation of the take-up roll 13, the strip 31 is again bound beneath the outer convolution of roll 13, is again drawn taut against supply film roll 10, and engages said outer convolution of take-up roll 13 with sufficient friction to overcome the tendency drive. Whereupon the cycle may be repeated.

The binding action of the outer convolution of take-up roll 13 also tensions the flexible strip 31 throughout its length. As the diameter of supply roll 10 decreases, this binding action will cause movement of the strip 31 along its length and will move graduations 41 thereon with respect to the opening 40 or 42 so that film footage readings corresponding to the amount of film on said roll 10 may be observed through said openings. Furthermore, less snubbing action on the supply film roll 10 is required as the diameter of said roll 10 decreases and accordingly the length of the arc of contact and the area of frictional engagement between the strip 31 and the outer convolution of roll 10 becomes less with decrease in the diameter of supply roll 10. This reduction of snubbing action upon the supply roll 10 with decrease in diameter thereof is illustrated by the dot dash lines of Fig. 2.

The film from supply roll 10 is ultimately wound upon the take-up roll 13 so that as the diameter of the former decreases the diameter of the latter increases. Increase in the diameter of the take-up roll 13 increases the distance through which the force of the tendency drive is acting and requires a greater snubbing action to overcome said tendency drive. But as the diameter of said supply roll 10 becomes smaller the binding and winding action of the take-up roll 13 will draw the strip 31 along its length and a greater length of said strip 31 will be wound onto said take-up roll 13. This longitudinal movement of strip 31 with decrease in the diameter of roll 10 is such that said strip 31 is always wrapped approximately around three-quarters of the periphery of said roll 13. This condition is also indicated by the dot dash lines of Fig. 2.

Consequently the snubbing means as provided by the flexible strip 31 performs many functions all conducive to proper advancement and movement of film through a film handling apparatus or a motion picture film magazine. The principal functions are: snubbing of the supply film roll by a frictional engagement which decreases with decrease in the diameter of said supply roll; provision of accurate and reliable footage indications with change in diameter of the supply film roll; snubbing of the take-up film roll by a frictional engagement which is released or reduced upon movement of film through the gate, which is sufficient to overcome the tendency take-up drive and prevent movement of film through the gate by said take-up drive, and which increases with increase in the diameter of the take-up film roll.

The snubbing means of the invention is susceptible of many changes or modifications and the present disclosure is to be construed in an illustrative and not in a limiting sense, the scope of the invention being defined in the appended claims.

Having now particularly described my invention what I desire to secure by Letters Patent of the United States and what I claim is:

1. In a film handling apparatus, the combination with a pair of supports each for rotatably supporting a film roll, and film moving means for unwinding film from one film roll and onto the other film roll, of a flexible strip fixed at one end and adapted partially to encircle one film roll outside of the outer convolution and adapted partially to encircle the other film roll inside of the outer convolution.

2. In a film handling apparatus, the combination with a pair of supports, one for rotatably supporting a supply film roll and the other for rotatably supporting a take-up film roll, and a film moving means for unwinding film from said supply film roll and onto the take-up film roll, of a flexible strip fixed at one end, and a plurality of guide members arranged to direct said flexible strip around the outside of the outer convolution of said supply film roll and also around the take-up film roll under the outer convolution thereof.

3. In a film handling apparatus, the combination with a pair of supports, one for rotatably supporting a supply film roll and the other for rotatably supporting a take-up film roll, a film moving means adapted intermittently to advance the film and unwind the same from said supply film roll, and a second film moving means connected to the spindle supporting the take-up film roll, of a flexible strip fixed at one end, and a plurality of guide members arranged to conduct said flexible strip around the outer convolution of said supply film roll and around the next to the outer convolution of the take-up film roll.

4. In a film magazine, the combination with a casing adapted to contain a pair of film rolls, of a flexible strip within said casing and fixed at one end, and a plurality of guide members within said magazine and for conducting said flexible strip partially to encircle each of said film rolls in frictional engagement therewith.

5. In a film magazine, the combination with a casing adapted to contain a pair of film rolls, of a flexible strip within said casing and fixed at one end, and a plurality of guide members within said magazine and for conducting said flexible strip partially to encircle one of said film rolls outside of the outer convolution and partially to encircle the other of said film rolls inside of the outer convolution.

6. In a film handling apparatus, the combination with a film magazine having an aperture and adapted to contain a pair of film rolls and a film strip extending from one film roll past said aperture to the other film roll, a film moving means for intermittently advancing the film strip past said aperture and unwinding film from one of said film rolls, and a tendency drive for winding film onto the other film roll as the film strip is advanced by the intermittent film moving means, of a snubbing means adapted frictionally to engage the outer convolutions of said film rolls and for preventing over-running of the unwinding film roll and preventing said tendency drive from moving film past said aperture.

7. In a film handling apparatus, the combination with a film magazine having an aperture and adapted to contain a pair of film rolls and a film strip extending from one film roll past said aperture to the other film roll, a film moving means for intermittently advancing the film strip past said aperture and unwinding film from one of said film rolls, and a tendency drive for winding film onto the other film roll as the film strip is advanced by the intermittent film moving means, of a flexible strip fixed at one end, adapted frictionally to engage the outer convolutions of said film rolls and for preventing over-running of the unwinding film roll and preventing said tendency drive from moving film past said aperture.

8. In a film handling apparatus, the combination with a film magazine having an aperture and adapted to contain a pair of film rolls and a film strip extending from one film roll past said aperture to the other film roll, a film moving means for intermittently advancing the film strip past said aperture and unwinding film from one of said film rolls, and a tendency drive for winding film onto the other film roll as the film strip is advanced by the intermittent film moving means, of a flexible strip in said magazine and fixed at one end, and a plurality of guide members within said magazine and located to conduct said flexible strip into frictional engagement with the outside of the outer convolution of one film roll to prevent overrunning thereof and in engagement with the inner side of the outer convolution of the other film roll to prevent advancement of the film strip past the aperture by the tendency drive.

9. In a film handling apparatus, the combination with a pair of supports adapted respectively to support a supply film roll and a receiving film roll, of a flexible strip fixed at one end, and guide means for conducting said flexible strip partially to encircle said receiving film roll beneath the outer convolution thereof, the length of said flexible strip in contact with said receiving film roll varying directly with the diameter of said receiving film roll.

10. In a film handling apparatus, the combination with a pair of supports adapted respectively to support a supply film roll and a take-up film roll, of a flexible strip fixed at one end, and guide means for conducting said flexible strip partially to encircle said take-up film roll beneath the outer convolution thereof and partially to encircle said supply film roll and arranged so that the length of flexible strip in contact with said take-up film roll varies inversely with the diameter of said supply film roll.

11. In a film handling apparatus, the combination with a pair of supports adapted respectively to support a supply film roll and a take-up film roll, of a flexible strip fixed at one end, and guide means for conducting said flexible strip frictionally to engage the outer convolutions of said film rolls and arranged so that the area of frictional contact between said strip and each film roll varies directly with the diameters of the respective film rolls.

12. In a film magazine, the combination with a casing adapted to contain a film roll and provided with an opening, of a flexible strip fixed at one end within said casing and having a plurality of graduations, and guide means within said magazine for conducting said flexible strip partially to encircle said film roll in frictional engagement therewith and past said opening with said graduation adjacent the same.

13. In a film magazine, the combination with a casing adapted to contain a film roll and provided with an opening, of a flexible strip within said magazine having footage indicia thereon in frictional engagement with said film roll, and movable past said opening.

14. In a film magazine, the combination with a casing adapted to contain a pair of film rolls and provided with an exposure aperture and an opening, of a flexible strip fixed at one end within said casing and carrying footage indicia, and guide means within said magazine for conducting said strip partially to encircle one of said film rolls, past said opening and partially to encircle the other film roll in frictional engagement therewith.

15. In a film magazine, the combination with a casing adapted to contain a pair of film rolls and provided with an exposure aperture and an opening, of a flexible strip fixed at one end within said casing and carrying footage indicia, and guide means within said magazine for conducting said strip partially to encircle one of said film rolls, past said opening and partially to encircle the other film roll in frictional engagement therewith, and for permitting longitudinal movement of said strip under the control of one of said film rolls.

16. In a film handling apparatus, the combination with a pair of supports adapted respectively to support a supply film roll and a take-up film roll, a film gate adapted to support the film in its path from the supply film roll to the take-up film roll, an advancing mechanism for intermittently moving film through said gate, and a tendency drive for rotating said take-up film roll and for winding film thereon, of a flexible strip fixed at one end, and guide means conducting the other end of said flexible strip into a position between the two outer convolutions of said take-up film roll, in which position the other end of said strip is adapted frictionally to engage said convolutions and to prevent rotation of said take-up film roll by said tendency drive, and also is adapted upon advancement of the film through said gate to lie loosely between said outer convolutions of said take-up film roll and permit rotation thereof by said tendency drive.

17. In a film handling apparatus, the combination with a film magazine containing supply and take-up film rolls and extending in a predetermined path from the supply film roll to the take-up film roll, an intermittent mechanism for advancing the film through a portion of said predetermined path, and a tendency drive connected to said take-up film roll and for winding film thereon, of a flexible strip within said magazine and fixed at one end, and guide means conducting the other end of said flexible strip into a position between the two outer convolutions of said take-up film roll, said flexible strip being adapted upon winding of the take-up film roll to be bound between said convolutions with sufficient friction to prevent rotation of said take-up film roll by said tendency drive.

18. In a film handling apparatus, the combination with a film magazine containing supply and take-up film rolls and extending in a predetermined path from the supply film roll to the take-up film roll, an intermittent mechanism for advancing the film through a portion of said predetermined path, and a tendency drive connected to said take-up film roll and for winding film thereon, of a flexible strip within said magazine and fixed at one end, and guide means conducting the other end of said flexible strip into a position between the two outer convolutions of said take-up film roll, said flexible strip being adapted upon winding of the take-up film roll to be bound between said convolutions with sufficient friction to prevent rotation of said take-up film roll by said tendency drive, and being adapted upon advancement of the film by the intermittent mechanism to lie loosely between the outer convolutions of said take-up film roll and permit rotation thereof by said tendency drive.

19. In a film magazine, the combination with a casing adapted to contain supply and take-up film rolls and provided with an exposure aperture and with an opening, and a length of film extending from one film roll to the other film roll and past said exposure aperture, of a flexible strip fixed at one end adjacent said supply film roll, a guide member located in the upper portion of said casing and located to conduct said strip partially to encircle said supply film roll and past said opening, a second guide member for conducting said strip in a double layer over said supply film roll, and a third guide member for conducting said strip to said take-up film roll beneath the outer convolution thereof.

20. In a film magazine, the combination with a casing adapted to contain supply and take-up film rolls and provided with an exposure aperture and with an opening, and a length of film extending from one film roll to the other film roll and past said exposure aperture, of a flexible strip fixed at one end adjacent said supply film roll, a guide member located in the upper portion of said casing and located to conduct said strip partially to encircle said supply film roll, a second guide member for conducting the flexible strip past said opening, and a third guide member for conducting said strip to said take-up film roll beneath the outer convolution thereof.

21. In a film magazine, the combination with a casing adapted to contain supply and take-up film rolls and provided with an exposure aperture and with an opening, and a length of film extending from one film roll to the other film roll and past said exposure aperture, of a flexible strip fixed at one end adjacent said supply film roll, a guide member located in the upper portion of said casing and located to conduct said strip partially to encircle said supply film roll, a second guide member for conducting the flexible strip past said opening, a third guide member for conducting said strip to said take-up film roll beneath the outer convolution thereof, and a film guide member for conducting the film onto said take-up film roll.

OTTO WITTEL.